(12) United States Patent
Bassett

(10) Patent No.: US 8,707,811 B2
(45) Date of Patent: Apr. 29, 2014

(54) SPINDLE DRIVE

(75) Inventor: Frederick Bassett, Scheidegg (DE)

(73) Assignee: Liebherr-Aerospace Lindenberg GmbH, Lindenberg/Allgau (DE)

( * ) Notice: Subject to any disclaimer, the term of this patent is extended or adjusted under 35 U.S.C. 154(b) by 979 days.

(21) Appl. No.: 12/785,789

(22) Filed: May 24, 2010

(65) Prior Publication Data

US 2010/0307268 A1 Dec. 9, 2010

(30) Foreign Application Priority Data

May 25, 2009 (DE) .......................... 10 2009 022 406

(51) Int. Cl.
*F16H 1/20* (2006.01)
(52) U.S. Cl.
USPC ........................................ 74/89.26; 74/89.23
(58) Field of Classification Search
USPC ...................... 244/213–217, 99.2–99.4, 99.9; 74/89.23, 89.26, 89.36
See application file for complete search history.

(56) References Cited

U.S. PATENT DOCUMENTS

| | | | | |
|---|---|---|---|---|
| 4,442,928 A | * | 4/1984 | Eastman | 477/185 |
| 5,628,477 A | * | 5/1997 | Caferro et al. | 244/214 |
| 6,299,259 B1 | * | 10/2001 | MacKarvich | 301/127 |
| 7,634,951 B2 | * | 12/2009 | Frieb-Preis et al. | 74/89.38 |
| 2007/0289397 A1 | * | 12/2007 | Ritter | 74/22 A |
| 2009/0293639 A1 | * | 12/2009 | Schmeisser et al. | 73/862.08 |
| 2011/0006154 A1 | * | 1/2011 | Maresko et al. | 244/99.2 |

FOREIGN PATENT DOCUMENTS

| | | |
|---|---|---|
| DE | 20009347 | 8/2000 |
| EP | 0076750 | 4/1983 |
| EP | 2108932 | 10/2009 |
| WO | 2008/141792 | 11/2008 |

* cited by examiner

*Primary Examiner* — Timothy D Collins
*Assistant Examiner* — Jamie S Stehle
(74) *Attorney, Agent, or Firm* — Dilworth & Barrese, LLP.

(57) ABSTRACT

The present invention relates to a spindle drive having a first load path which is formed by the spindle and having a second load path which is formed by a torsion bar which is exposed to torsion, which is arranged in the spindle and is connected to it such that a rotary movement is exerted onto the spindle in at least one state of the threaded drive by the torsion bar, with the spindle drive having a sensor unit which is made such that it detects a relative movement between the spindle and the torsion bar.

20 Claims, 1 Drawing Sheet

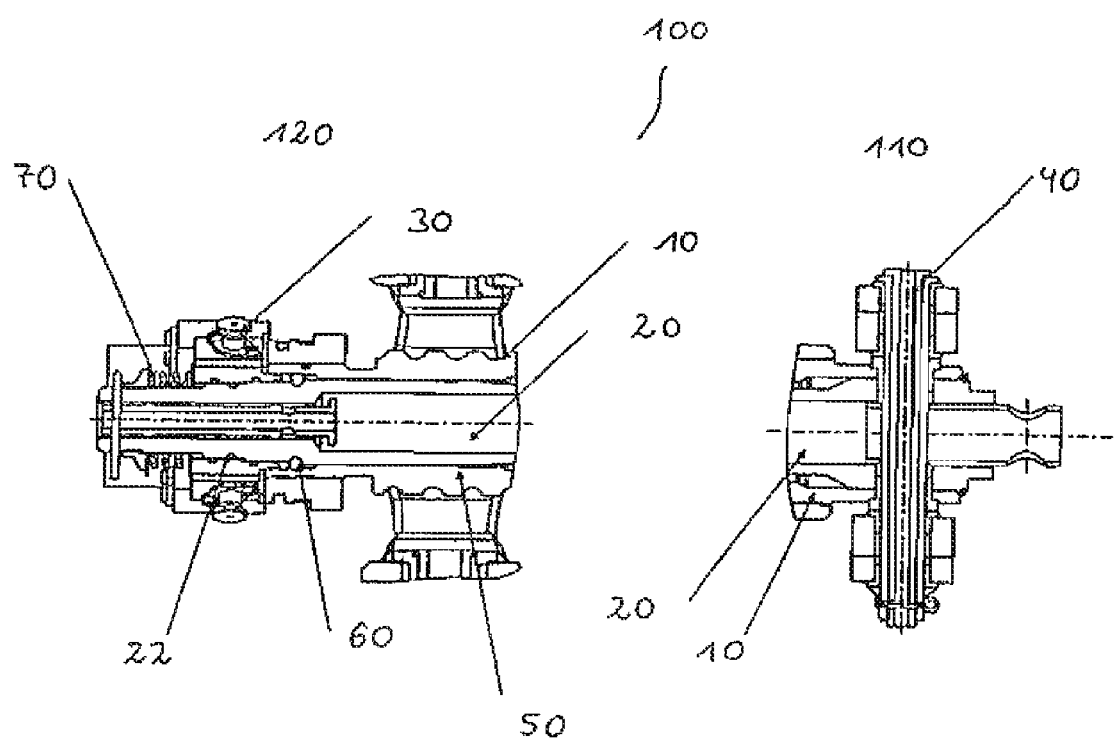

SPINDLE DRIVE

BACKGROUND OF THE INVENTION

The present invention relates to a spindle drive, in particular for the movement of a component such as a flap of an aircraft.

Spindle drives are known in different designs. They effect a movement in translation either of the spindle or of the nut meshing with it to effect a linear movement of a component.

It is in particular important in the control of components of an aircraft that it is ensured that the control capability of the aircraft remains ensured even on a defect of a part of the spindle drive and that the defective actuator remains completely functional or at least partly functional during the remaining flight time.

SUMMARY OF THE INVENTION

It is the underlying object of the present invention to provide a spindle drive which satisfies this object and which, in the event of a defect of one load path, enables an actuation via the other load path and by means of which it is indicated that such a defect event has occurred.

This object is achieved by a spindle drive having the features herein.

Provision is accordingly made that the spindle drive is made with a first load path which is formed by the spindle and with a second load path which is formed by a torsion bar which is exposed to torsion, which is arranged in the spindle and is connected to it such that a rotary movement is exerted onto the spindle in at least one state of the threaded drive by the torsion bar, with a sensor unit being arranged in at least one region of the spindle which is made such that it detects a relative movement between the spindle and the torsion bar. In the event of defect, i.e. on the failure of the first or of the second load path, there is a relative movement between the spindle and the torsion bar which is directly or indirectly detected by the sensor unit.

The torsion bar can be rotationally fixedly connected to the spindle in a region, preferably in an end region of the threaded drive and secured against an axial displacement. Such a connection can be effected, for example, by a bolt, pin or the like.

Provision can furthermore be made that the torsion bar is connected to the spindle in a region, preferably in an end region of the threaded drive, via a wedge-shaped section via which a torque can be transmitted between the torsion bar and the spindle. It is furthermore conceivable that the torsion bar is connected to the spindle in a region, preferably in an end region, via a ring for the taking up of axial forces.

It a failure of the first load path occurs, the torque is transmitted through the wedge-shaped section and axial farces are transmitted through the ring.

The sensor unit can be connected to a region, preferably to an end region of the spindle, such that it is axially displaceable with the spindle. It is thus conceivable that an axial movement of the spindle and thus also of the sensor unit occurs in the defect event which is then detected by the sensor unit.

Provision can furthermore be made that the sensor unit is made non-rotatable.

The spindle can be made such that it is secured against rotation in the normal operation of the spindle drive.

in a further embodiment of the invention, the torsion bar is connected to the spindle or to the sensor unit by a spring which exerts a force acting in the axial direction. The spring can be a compression spring.

The torsion bar can be made biased such that the rotational movement of the spindle exerted by it takes place in a direction such that a compression of the spring takes place. This case can, for example, occur when there is a failure of the spindle in a region below the nut. In this case, the axially movable end of the spindle is set into a rotational movement by the torsion bar, whereby a relative movement occurs between the spindle and the nut. The spring is compressed by the axial movement of the axially movable end of the spindle.

The sensor unit can be made such that it detects the movement of a piston or the like, with the piston being arranged such that it undergoes a movement on a relative movement between the torsion bar and the spindle. The sensor unit can be present singly or multiply and can also, for example, have one LVDT (linear variable displacement transducer) or, for reasons of redundancy, also two or more LVDTs which are activated by the piston or detect its displacement.

The piston can be arranged in a groove of the torsion bar in the normal operating state of the threaded drive and can be moved toward the torsion bar in the radial direction in the defect event.

The torsion bar preferably has a length which exceeds that of the threaded bolt.

Provision can furthermore be made that the spindle drive is connected to a component whose position is to be changed such as a rudder, a flap or the like of an aircraft, in particular of an airplane.

The invention furthermore relates to an aircraft having at least one spindle drive in accordance with the description herein The terms spindle drive, spindle and nut are to be given a wide interpretation and include a conventional threaded spindle drive in which a nut meshes with the thread of a threaded bolt. It equally includes, however, any other desired spindle drives which work with rolls, rollers, etc. as well as also those in which the rolls, rollers, etc. recirculate, such as e.g. circulating ball spindle drives or threaded spindles.

BRIEF DESCRIPTION OF THE DRAWING

Further details and advantages of the invention will be explained in more detail with reference to an embodiment shown in the drawing.

The only FIGURE shows the two end regions of a threaded drive in accordance with the present invention.

DESCRIPTION OF THE PREFERRED EMBODIMENTS

The spindle drive 100 in accordance with the present embodiment is a linear actuator for the effecting of the movement of a component, for example of an airplane. It can be arranged between the airplane structure and, for example, a movable panel or the like.

The spindle drive 100 includes a sensor unit 30 as well as a downstream architecture which makes it possible that a failure of the primary load path and of the secondary load path is detected.

Either the nut or the spindle can serve the movement of the component in question. Both cases are covered by the invention.

The spindle drive 100 includes a primary load path which is formed by the threaded bolt 10 which has a thread or the like at its outer side with which a nut meshes which is not shown in any more detail. If the nut or the threaded bolt 10 is set into a rotational movement, a relative movement of both elements occurs, whereby the linear movement of the actuator is effected.

The threaded bolt 10 is hollow and receives the torsion bar 20 in its inner space. The torsion bar 20 forms the secondary load path.

The torsion bar 20 is connected to the threaded bolt 10 via a bolt 40 in the end region 110. The bolt 40 passes through radial bores in the threaded bolt 10 and in the torsion bar 20 and in this manner secures the threaded bold 10 and the torsion bar 20 against relative movements in the axial direction and in the rotary direction in this end region 110.

In the other end region 120, the torsion bar 20 and the threaded bolt 10 are connected to one another via a wedge-shaped section 50 which is designed such that a torque can be transmitted from the torsion bar 20 to the threaded bolt 10 if a failure of the first load path should occur. The ring 60, which is arranged between the torsion bar 20 and the threaded bolt 10, in this case provides the transmission of axial forces.

The torsion bar 20 is inserted into the threaded bolt 10 under torsion on assembly such that a torque exists between the threaded bolt 10 and the torsion bar 20. The direction of this torque extends such that the nut turns off the threaded bolt 10 when the first load path fails.

As stated, the sensor unit 30 is located at the end region of the threaded bolt 10 in which the latter is connected to the torsion bar 20 via the wedge-shaped section 50. In the normal operating state of the threaded drive 100, a piston, not shown, movable in the radial direction with respect to the torsion bar 20 is located in a groove 22 of the torsion bar 20.

As can be further seen from the FIGURE, the torsion bar 20 is spring-loaded in its end region with respect to the threaded bolt 10 and the sensor unit 30 via the spring 70.

If a failure of the threaded bolt 10 occurs in a region between the nut and the connection point between the threaded bolt 10 and the component to be moved, the forces generated by the air flow and acting on the component have the result that the two mutually separated parts of the threaded bolt 10 move away from one another. This relative movement has the result that the axially freely movable end of the threaded bolt 10 shown at the left in the FIGURE and the sensor unit 30 are moved axially (to the left in accordance with the FIGURE) relative to the torsion bar 30, whereby the spring 70 is compressed. The piston of the sensor 30 is thereby moved away from the torsion bar 20 axially and perpendicular to the torsion bar since it is pressed out of the groove 22 in the torsion bar 20. This movement of the piston is detected by the sensor unit 30 and a corresponding signal can be generated.

If a failure of the threaded bolt 10 occurs in a region below the nut, the threaded bolt 10 is set into a rotational movement by the torsion bar 20, with the threaded bolt 10 being "moved away" from the nut. This relative movement has the result that the axially freely movable end of the threaded bolt 10 and the sensor unit 30 are moved axially (to the left in accordance with the FIGURE) relative to the torsion bar 30, whereby the spring 70 is compressed. The piston of the sensor 30 is thereby moved away from the torsion bar 20 axially and perpendicular to the torsion bar since it is pressed out of the groove 22 in the torsion bar 20. This movement of the piston is detected by the sensor unit 30 and a corresponding signal can be generated.

If the threaded bolt 10 fails outside the influence of forces on the component to be moved, it can occur in a first case that the break does not extend perpendicular to the spindle axis. In this case, the torque generated by the torsion bar 20 effects an axial movement of the threaded bolt 10 relative to the torsion bar 20. The axially freely movable part of the threaded bolt 10 is moved together with the sensor 30 relative to the torsion bar 20, whereby a compression of the spring 70 takes place. As stated above, the movement of the piston caused thereby is detected by the sensor 30.

If, in a second case, a break of the threaded bolt 10 occurs perpendicular to the spindle axis, the torsion of the torsion bar 20 results in a rotational movement of the part of the threaded bolt 10 which has failed relative to the torsion bar 20. The movement of the threaded bolt 10 relative to the nut has the result that the nut displaces the axially freely movable part of the threaded bolt 10, whereby this section of the spindle 10 and the sensor 30 are moved axially to the torsion bar 20. As stated above, in this case a compression of the spring 70 and a movement of the piston out of the groove 22 of the torsion bar 20 occur. This is detected by the sensor unit 30.

If, finally, a failure of the torsion bar 30 occurs, the torsion torque is lost. In this case, the spring 70 pulls the separated region of the torsion bar 30 through the sensor unit 30 in the end region 120 of the threaded drive 100, whereby a relative movement is caused between the torsion bar 30 and the sensor unit 30. This results in the above-described movement of the piston which is detected by the sensor 30.

The invention claimed is:

1. A spindle drive (100) having a first load path formed by a spindle (10) and having a second load path formed by a torsion bar (20) exposed to torsion, arranged in the spindle (10) and connected to the spindle such that a rotational movement is exerted onto the spindle (10) by the torsion bar (20) in at least one state of the spindle drive (100), wherein the spindle drive (100) has a sensor unit (30) configured to detect a relative movement between the spindle (10) and the torsion bar (20).

2. A spindle drive (100) in accordance with claim 1, wherein the torsion bar (20) is rotationally fixedly connected to the spindle (10) in a region, preferably in an end region (110) of the spindle drive (100) and secured against an axial displacement.

3. A spindle drive (100) in accordance with claim 1, wherein the torsion bar (20) is connected to the spindle (10) by a bolt (40) which secures the spindle (10) and the torsion bar (20) relative to one another in the axial direction and in the direction of rotation.

4. A spindle drive (100) in accordance with claim 1, wherein the torsion bar (20) is connected to the spindle (10) in a region, preferably in an end region (120) of the spindle drive (100) via a wedge-shaped connection section (50) via which a torque can be transmitted between the torsion bar (20) and the spindle (10).

5. A spindle drive (100) in accordance with claim 1, wherein the torsion bar (20) is connected to the spindle (10) in a region, preferably in an end region (120), via a ring (60) for the taking up of axial forces.

6. A spindle drive (100) in accordance with claim 1, wherein the sensor unit (30) is connected to a region, preferably to an end region, of the spindle (10) such that the spindle drive is axially displaceably arranged with the spindle (10).

7. A spindle drive (100) in accordance with claim 1, wherein the sensor unit (30) is arranged rotationally fixedly.

8. A spindle drive (100) in accordance with claim 1, wherein the torsion bar (20) is connected to the spindle (10) or to the sensor unit (30) by a spring (70) which exerts a force acting in the axial direction.

9. A spindle drive (100) in accordance with claim 8, wherein the spring (70) is a compression spring (70).

10. A spindle drive (100) in accordance with claim 8, wherein the rotational movement of the spindle (10) exerted by the torsion bar (20) takes place in a direction such that a compression of the spring (70) takes place.

11. A spindle drive (100) in accordance with claim 1, wherein the sensor unit (30) is configured such that the sensor unit detects the movement of a piston, with the piston being arranged such that it undergoes a movement on a relative movement between the torsion bar (20) and the spindle (10).

12. A spindle drive (100) in accordance with claim 11, wherein the piston is arranged in a groove (22) of the torsion bar (20) in the normal operating state and is moved in a radial direction toward the torsion bar (20) in a defect event.

13. A spindle drive (100) in accordance with claim 1, wherein the torsion bar (20) has a length which exceeds that of the threaded spindle (10).

14. A spindle drive (100) in accordance with claim 1, wherein the spindle drive (100) is connected to a component of an aircraft, in particular of an airplane, whose position is to be changed.

15. An aircraft, in particular an airplane, having at least one spindle drive (100) in accordance with one claim 1.

16. A spindle drive (100) in accordance with claim 2, wherein the torsion bar (20) is connected to the spindle (10) by a bolt (40) which secures the spindle (10) and the torsion bar (20) relative to one another in the axial direction and in the direction of rotation.

17. A spindle drive (100) in accordance with claim 16, wherein the torsion bar (20) is connected to the spindle (10) in a region, preferably in an end region (120) of the spindle drive (100) via a wedge-shaped connection section (50) via which a torque can be transmitted between the torsion bar (20) and the spindle (10).

18. A spindle drive (100) in accordance with claim 3, wherein the torsion bar (20) is connected to the spindle (10) in a region, preferably in an end region (120) of the spindle drive (100) via a wedge-shaped connection section (50) via which a torque can be transmitted between the torsion bar (20) and the spindle (10).

19. A spindle drive (100) in accordance with claim 2, wherein the torsion bar (20) is connected to the spindle (10) in a region, preferably in an end region (120) of the spindle drive (100) via a wedge-shaped connection section (50) via which a torque can be transmitted between the torsion bar (20) and the spindle (10).

20. A spindle drive (100) in accordance with claim 17, wherein the torsion bar (20) is connected to the spindle (10) in a region, preferably in an end region (120), via a ring (60) for the taking up of axial forces.

\* \* \* \* \*